(12) United States Patent
Pero

(10) Patent No.: US 7,090,275 B2
(45) Date of Patent: Aug. 15, 2006

(54) TAILGATE CARGO BOX

(76) Inventor: Michael Pero, P.O. Box 621, Lake Fork, ID (US) 83635-0621

( * ) Notice: Subject to any disclaimer, the term of this patent is extended or adjusted under 35 U.S.C. 154(b) by 52 days.

(21) Appl. No.: 11/029,062

(22) Filed: Jan. 3, 2005

(65) Prior Publication Data

US 2006/0145502 A1 Jul. 6, 2006

(51) Int. Cl.
B60N 3/12 (2006.01)
(52) U.S. Cl. .................. 296/37.6; 296/26.09
(58) Field of Classification Search ............... 296/37.6, 296/26.08, 26.09, 57.1; 224/402, 403, 281, 224/404
See application file for complete search history.

(56) References Cited

U.S. PATENT DOCUMENTS

| | | | |
|---|---|---|---|
| 1,357,686 A | 11/1920 | Bradway | |
| 2,091,070 A | 8/1937 | Girl | |
| 3,726,422 A | 4/1973 | Zelin | |
| 3,916,839 A * | 11/1975 | Hewes, Jr. | 119/675 |
| 4,219,229 A | 8/1980 | Ciocan | |
| 4,303,367 A | 12/1981 | Bott | |
| 4,752,095 A | 6/1988 | Brady | |
| 4,887,836 A | 12/1989 | Simjian | |
| 4,909,558 A | 3/1990 | Roshinsky | |
| 4,932,829 A * | 6/1990 | Miller | 414/462 |
| 4,950,123 A | 8/1990 | Brockhaus | |
| 5,018,930 A * | 5/1991 | Hardin et al. | 414/458 |
| 5,022,809 A | 6/1991 | Hinson | |
| 5,048,850 A * | 9/1991 | McDonald | 280/47.131 |
| 5,098,146 A * | 3/1992 | Albrecht et al. | 296/26.09 |
| 5,121,959 A * | 6/1992 | King | 296/37.6 |
| 5,513,941 A | 5/1996 | Kulas et al. | |
| 5,520,316 A | 5/1996 | Chen | |
| 5,829,945 A * | 11/1998 | Stanley | 296/26.09 |
| 5,893,598 A | 4/1999 | Silkowski et al. | |
| 5,931,632 A | 8/1999 | Dongilli et al. | |
| 5,934,725 A | 8/1999 | Bowers | |
| 6,007,248 A * | 12/1999 | Fulterer | 384/53 |
| 6,244,646 B1 | 6/2001 | Wheeler, III | |
| 6,308,873 B1 | 10/2001 | Baldas et al. | |
| 6,318,780 B1 | 11/2001 | St. Aubin | |
| 6,328,364 B1 | 12/2001 | Darbishire | |
| 6,398,283 B1 * | 6/2002 | Knudtson et al. | 296/26.09 |
| 6,422,567 B1 | 7/2002 | Mastrangelo et al. | |
| 6,464,277 B1 * | 10/2002 | Wilding | 296/37.6 |
| 6,705,656 B1 | 3/2004 | Keller | |
| 6,742,979 B1 * | 6/2004 | Salazar | 296/37.6 |
| 6,860,536 B1 * | 3/2005 | Schimunek | 296/37.6 |

* cited by examiner

Primary Examiner—Kiran B. Patel
(74) Attorney, Agent, or Firm—Derek H. Maughan; Dykas, Shaver & Nipper, LLP

(57) ABSTRACT

A cargo box having a folding first side that is configured to be placed within the rear portion of a pickup truck, and to be held against the tailgate of the pickup while the tailgate is closed, thus preventing the device from moving too far forward when the tailgate is closed. This device is also configured to be rolled along the bed of the pickup and rolled out of the rear of the pickup over the top of the tailgate when the tailgate is open and placed in a downward position. The device contains a stopping device that prevents the device from being pulled too far forward out of the rear portion of the pickup truck, or being pushed too far into the bed portion of the pickup truck.

9 Claims, 5 Drawing Sheets

TAILGATE CARGO BOX

BACKGROUND OF THE INVENTION

1. Field of the Invention

The present invention generally relates to storage devices utilized in a vehicle bed, and more particularly to a slideable cargo truck box adapted for connection within the rear end portion of a pickup truck cargo bed, between the wheel wells of the pickup truck bed.

2. Background Information

Pickup trucks have become a modern convenience for many persons because of their utility in transporting various large items over significant distances. In some locations, such as the rural areas of the United States, pickup trucks are very popular because they are simply better suited to accommodate the lifestyles of the persons who live in these areas. A pickup truck is, in many instances, the vehicle of choice among persons who must carry large or heavy items, haul trailers and other devices, and travel over unpaved and in some instances unimproved or un-maintained roads.

While a pickup truck is well suited for these circumstances, the carrying of smaller loads in these same pickup trucks can, at times, be problematic. One of the major disadvantages of utilizing a pickup truck is that the size of the bed of the pickup is often too large to securely hold smaller items. For example, a person utilizing a pickup truck to go to a store to retrieve a variety of smaller items, such as groceries, may oftentimes find himself in the situation where groceries are too numerous to be placed in the cab of the pickup truck. Therefore, these groceries are placed in the bed portion of the pickup truck. Without any device to secure the position of these items in the rear of the pickup truck, the groceries can then move or roll around the bed portion of the pickup. This moving results in the general dispersal of items across the bed of the pickup and requires that a party climb into the bed of the pickup to recover these items. In some instances, the items that are dispersed may tip, spill or be broken by the movement within the pickup bed. Placing items near the cab portion of the pickup truck bed does, in some instances, lessen the movement and dispersal of the items. However, removal of these items from the back portion of the pickup can be difficult, as it requires that a party have sufficient height and strength so as to be able to reach over the side of the bed of the pickup and lift the item(s) from within the pickup bed. Therefore, a generalized problem continues to be maintained with regard to the carrying and usage of items within the bed portion of a pickup truck.

A variety of devices have been utilized in an attempt to assist individuals with storing and removing materials from the back of a pickup truck. Some of these devices include containers that are permanently affixed to the pickup so as to contain the smaller items within them. These devices present significant problems in that they hamper and limit the overall functionality of the pickup truck itself by placing a permanent obstruction within the bed of the pickup truck itself. A few modifications of these devices allow for racks that roll into and out of the back of the pickup truck. However, all of these devices require some sort of mounting hardware that must be permanently attached to the bed of the pickup itself. These permanently affixed devices limit the utility of the pickup to be used for other purposes, and in essence take away one of the major utilitarian facets of the device, namely the ability and function of an open pickup truck bed. Another problem that occurs with many of these devices is that the racks involved have the tendency to roll off of their rollers and cause the damage to the pickup itself as well as to the rolling rack. Another problem with these devices is that the rollers may have the tendency to be pushed too far forward or backward from a designated position and as a result be inconvenient to a user.

Therefore, what is needed is a device that can be placed in the bed of a pickup truck that holds items in a desired location, orientation, and position, and which can be utilized to simply and easily remove these items from the back of a pickup. What is also needed is a device that achieves these results and which is not permanently connected to the bed of the pickup truck. What is also needed is a device that can be placed within the bed of a pickup and then rolled in and out of the back of the pickup so as to allow easy access to the materials within the cargo box itself. Another necessity is to provide a device that can be easily installed and removed from within the pickup truck as desired with a negligible amount of damage to the pickup bed.

Therefore, it is an object of the present invention to provide a device that can be placed within the bed of the pickup truck and which can be utilized to hold a variety of items in a desired position and orientation and within the bed of the pickup truck itself. It is another object of the invention to provide a device that can be placed in the bed of the pickup truck that holds items in a desired location, orientation, and position, and which can be utilized to simply and easily remove these items from the back of a pickup. Another object of the invention is to provide a device that is not permanently connected to the bed of the pickup truck and that can be easily removed from the bed of the pickup truck. Another object of the present invention is to provide a device that can be placed within the bed of a pickup and then rolled into and out of the back of the pickup, so as to allow easy access to the materials within the cargo box itself. Another object of the present invention is to provide a device that can be easily installed and removed from within the pickup truck as desired with a negligible amount of damage to the pickup bed.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a rolling cargo box configured for use in the bed of a pickup truck. This cargo box is configured to be placed within the rear portion of a pickup truck, and has a pair of rollers located within the bottom frame of the box so as to allow the box to be rolled into and out of the back of the pickup. A pair of stopping tabs prevent the movement of the box out of the back of the pickup when the tailgate is down, and a second set of tabs are configured to interconnect with the rear portion of the pickup and a portion of the tailgate so as to hold the box against the tailgate when the tailgate is in a closed position. This prevents the device from moving away from the accessible rear portion of the pickup when the tailgate is closed. In the preferred embodiment of the invention, one side of the box is hingedly attached to the device and is built so as to be able to be pulled down and opened so as to further facilitate the entry and removal of material from the inner portions of the box.

In the preferred embodiment, one side of the device is connected to the other portions of the device by a hinge, thus allowing this one side to be lowered and opened thus increasing the accessibility of a party to the internal portions of the device. The present invention does not require any permanent hardware to attach or connect the device to the bed of the pickup truck, and thus can be removed when desired so as to allow the bed of the pickup truck to be more fully utilized.

In the preferred embodiment of the invention, the bottom has a bottom frame that contains the rollers and a metal mesh cover that overlays the frame. The bottom portions of the frame in the preferred embodiment define a chamber that allows the rollers or wheels to rotate within the chamber and which provides a desired lower profile to the cargo box itself. This lower profile prevents many materials from becoming ensnared with the rollers and impeding the function of the storage box. While this lowered profile is described in the preferred embodiment, it is to be distinctly understood that the invention is not limited thereto but may be variously embodied according to the various necessities of a user.

The present invention may be an assembled unit or a kit for later sale and assembly. The device can be placed within the bed of a pickup by placing the box, without the stoppers, part of the way into the bed of the pickup and then installing the stoppers onto the device itself. With one set of stoppers in place on each side of the location in the pickup where the tailgate attaches, the device is ready for use. Removal of the device may be obtained by simply removing one of the sets of stoppers and rolling the device out of the pickup.

The present invention thus provides to a party a selectively removable storage rack into which items may be placed and removed according to the needs and necessities of a user. This storage rack can be rolled into and out of the back of the pickup, while stops positioned upon the device prevent the device from rolling either completely out of the truck or away from the tailgate of the truck toward the cab of the pickup. Furthermore, the front edge of the device can be closed and reopened so as to further facilitate the placement and removal of items from the storage device itself.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
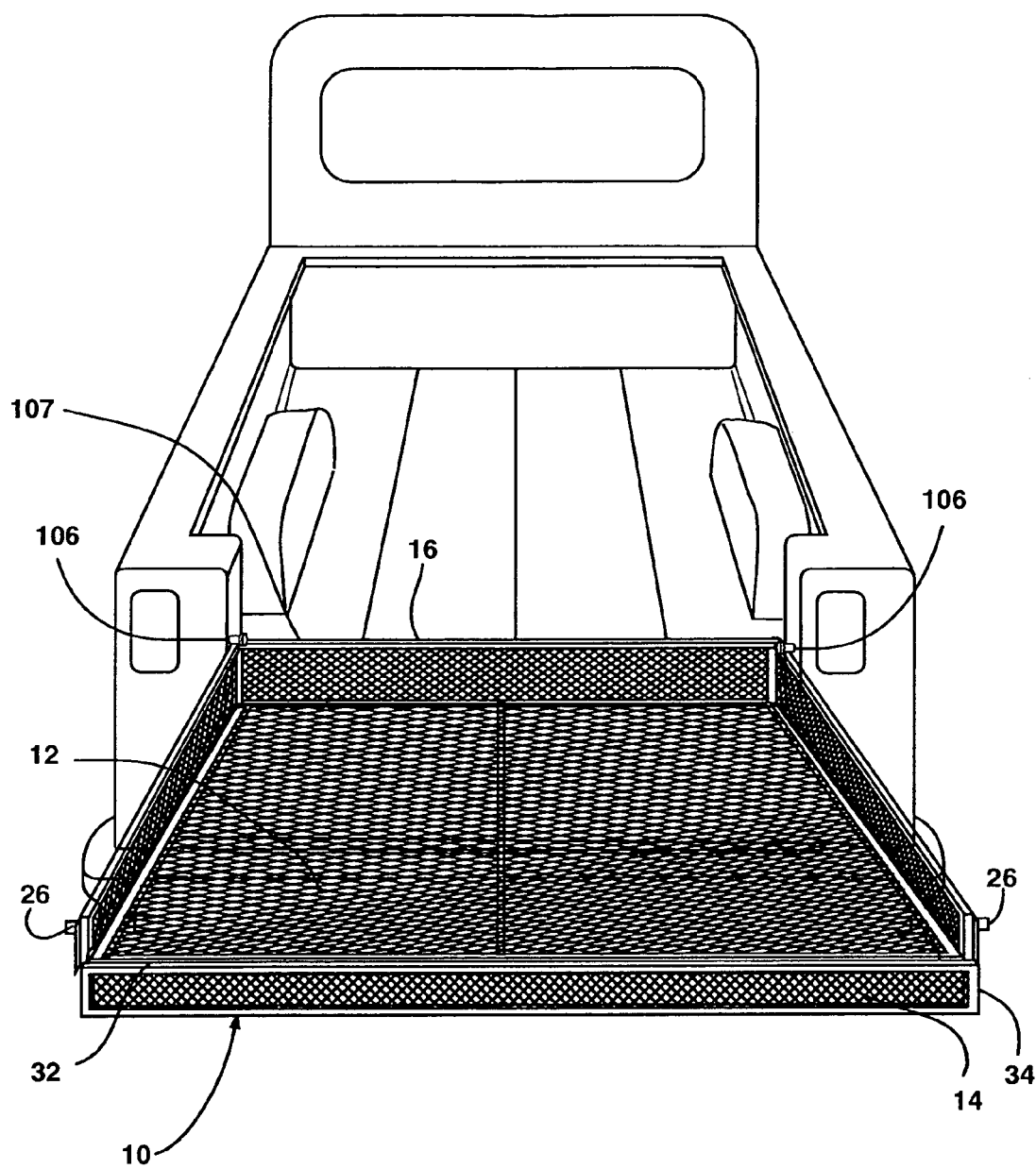
FIG. 1 is a front perspective view of the present invention pulled out from the bed of a pickup truck.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring now to FIGS. 1–5, various views of a first preferred embodiment of the invention is shown. FIG. 1 shows the present invention 10 in a loading position pulled out from its storage positions within the bed portion of a pickup truck. In this loading position, the rack is typically rolled out and placed over the tailgate of the pickup truck. While the invention is shown in the context of a particular style of pickup truck in FIGS. 1 and 5, it is to be distinctly understood that the invention is not limited to use in any one particular type of vehicle and that it may be adapted for use in a variety of types of pickup trucks and associated devices. The specific embodiment shown is merely for illustrative purposes and the type of configuration of various pickup trucks in which the present invention may be utilized are varied. As a result, the exact specifications of the invention would also vary so as to accommodate these various differences in configuration. The following descriptions are therefore intended to be illustrative in nature and not limiting in any regard. The exact specifications of any preferred embodiment of the present invention would be premised upon the exact specifications of the pickup bed in which the device would be utilized. Similarly, the modifications required to utilize the present invention in the most preferred manner are dependent upon a variety of specialized circumstances dependent upon each pickup truck in which the device is used. Therefore, the following description is meant to be illustrative in nature and not limiting.

The present invention is a storage box 10 configured for use within the bed of a pickup truck. While the present invention is intended and designed for such use, the invention is not exclusively limited thereto, but may be variously embodied to incorporate a variety of other types of vehicles and uses depending upon the circumstances of the user. A typical pickup truck bed has a front end located near the cab or passenger portion of the pickup and a back end located opposite the front end. A floor 107 extends from the front end of the bed to the back end of the bed and a pair of sidewalls extends in a generally spaced parallel relationship along the two sides of the pickup truck bed. At the back portion of the pickup truck bed a tailgate is typically hingedly attached to a portion of the bed. The hinge and the tailgate mechanism of the device allow the tailgate to be alternatively placed in either an upright closed or a downward locked position.

In a typical pickup truck, a pair of strikers 106 is positioned upon the side walls of the truck near the tailgate. The strikers and the back portion of the pickup truck bed are configured to interact with a tailgate latch, which is typically located within the tailgate portion of the device. The latch and the strikers 106 interact so as to allow the tailgate to be releasably held and released from an upright closed position. In addition to these previously described features, a variety of other features such as protective coverings and linings may also be placed upon a variety of surfaces within the bed of the pickup truck itself. Some of the prior art devices were incompatible with these items and as a result, these protective linings and coverings would have to be removed in order to allow the other portions of the device to be used. Because of the configuration of the present invention, the configuration in most of these pieces of additional optional features of the pickup will have no effect upon the use and function of the present invention.

The present invention is a storage box 10 that is configured for placement within the back bed portion of a pickup truck as is shown in FIG. 1. This storage box 10 has a set of wheels 24 (shown in FIG. 3 and FIG. 4) and at least one and preferably two sets of tabs 26, 27 that allow the storage box 10 to be rolled into and out of the bed of the pickup across the tailgate of the pickup. The tabs 26, 27 are positioned at opposing ends of the storage box 10. These tabs 26, 27 make up a stop mechanism that prevent the box 10 from being rolled completely out of the pickup in one direction, as well as preventing the storage box 10 from moving around within the rear portion of the pickup when the device 10 is placed inside of the pickup.

Figure 5:
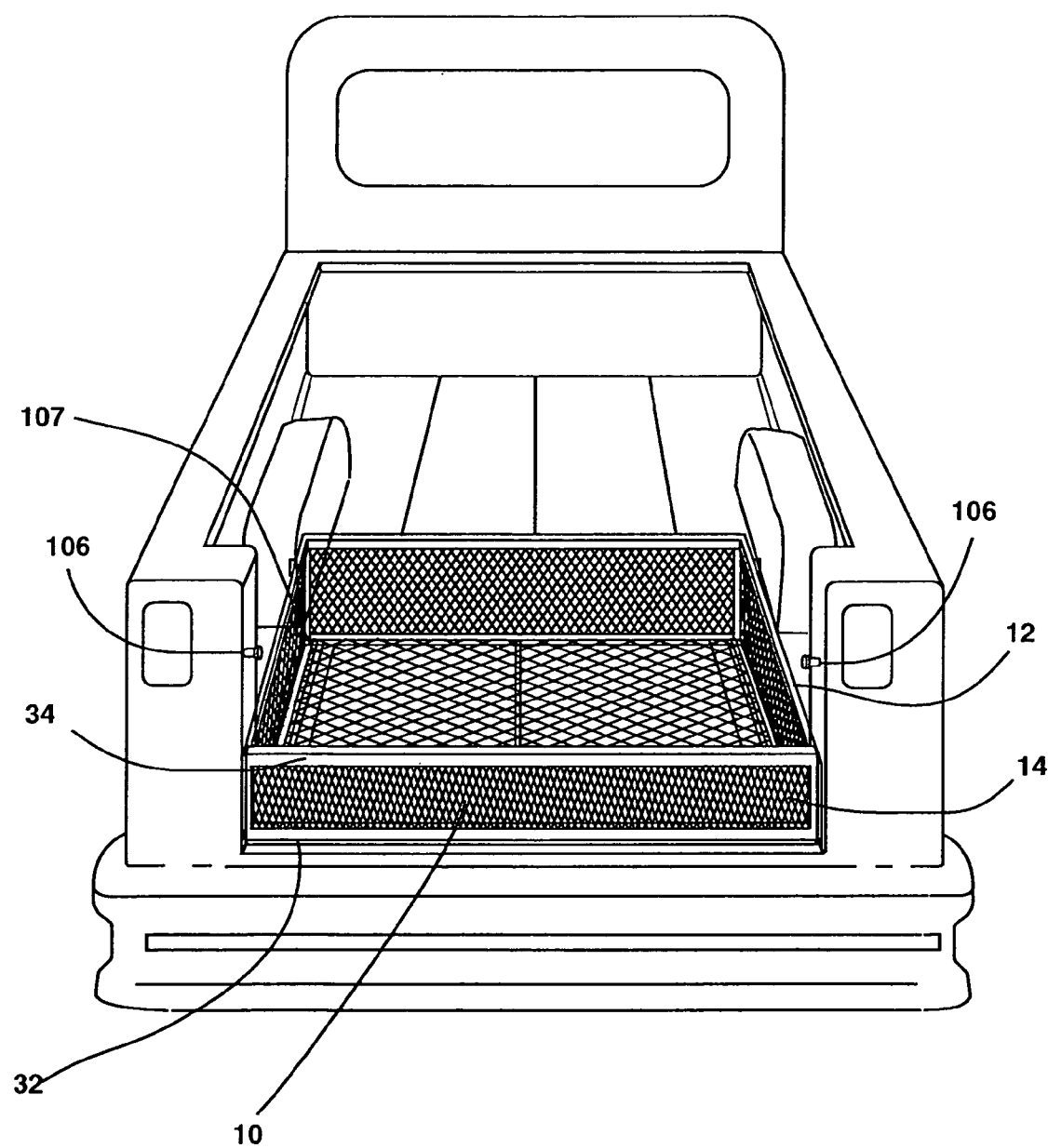
FIG. 5 is a perspective view of the preferred embodiment of the invention in a stored position within the bed of the pickup truck.

FIGS. 1 and 5 of the present invention show the present invention in two different positions within the bed of a pickup truck. FIG. 1 shows a perspective view of the present invention 10. In this figure, the box 10 of the present invention has been pulled out of the bed of the pickup truck and is positioned so that the bottom portion 12 of the rack 10 is positioned over the lowered tailgate of the pickup truck. In the preferred embodiment, the front side 14 of the cargo box rack 10 is connected to the bottom 12 of the cargo rack by a hinge 32, which allows the front side 14 of the cargo box 10 to be folded down. This configuration allows material to be more easily placed and removed within the box 10. FIG. 5 shows an embodiment of this same invention wherein the front side 14 has been placed in an upward position. With this front side 14 then in the upright position, the box 10 can then be rolled back into the bed of the pickup. In the preferred embodiment, a portion of the box 10 is configured to fit between the wheel wells in the back of the pickup truck.

Figure 2:
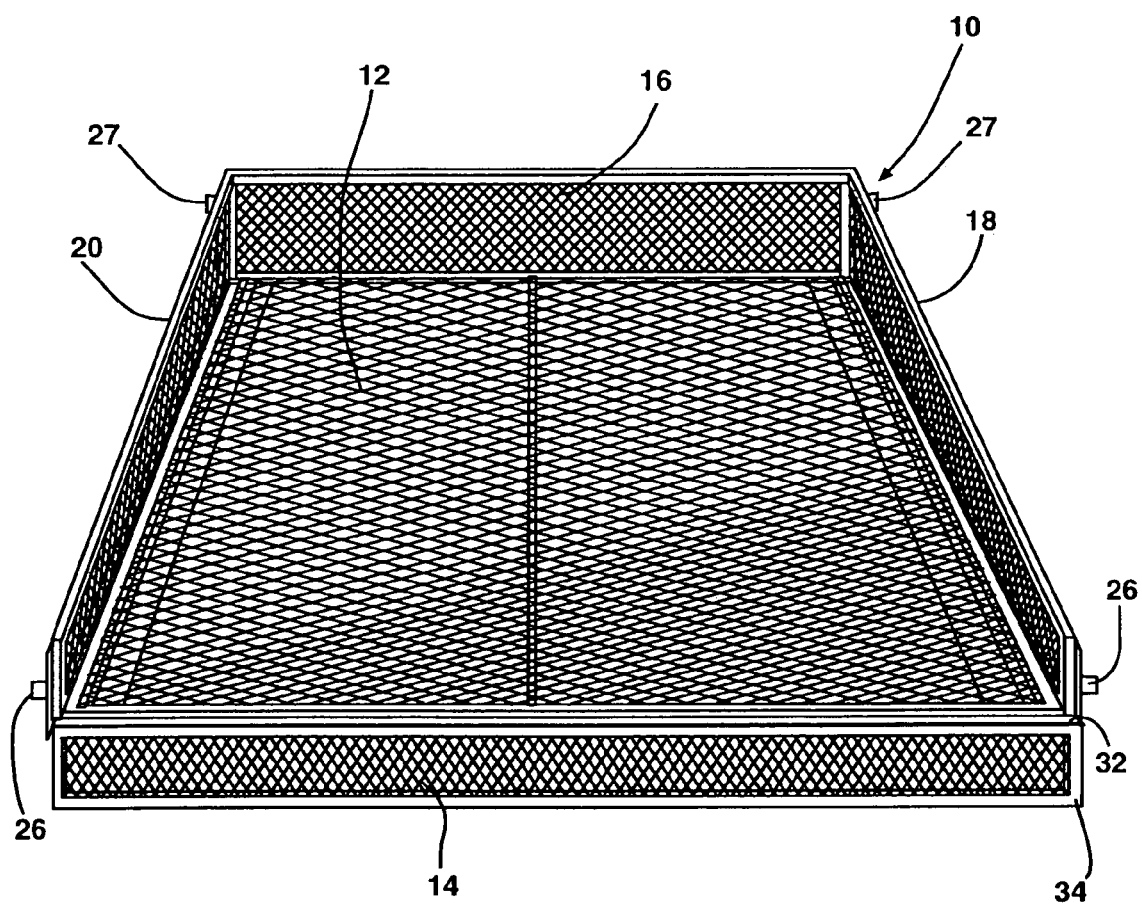
FIG. 2 is a front perspective view of the present invention alone outside of a pickup truck.
Figure 3:
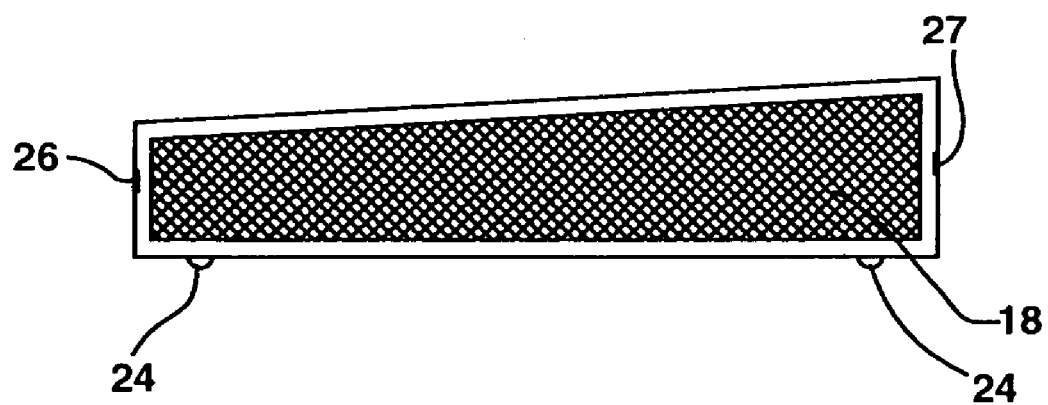
FIG. 3 is a side plan view of the preferred embodiment of the invention.
Figure 4:
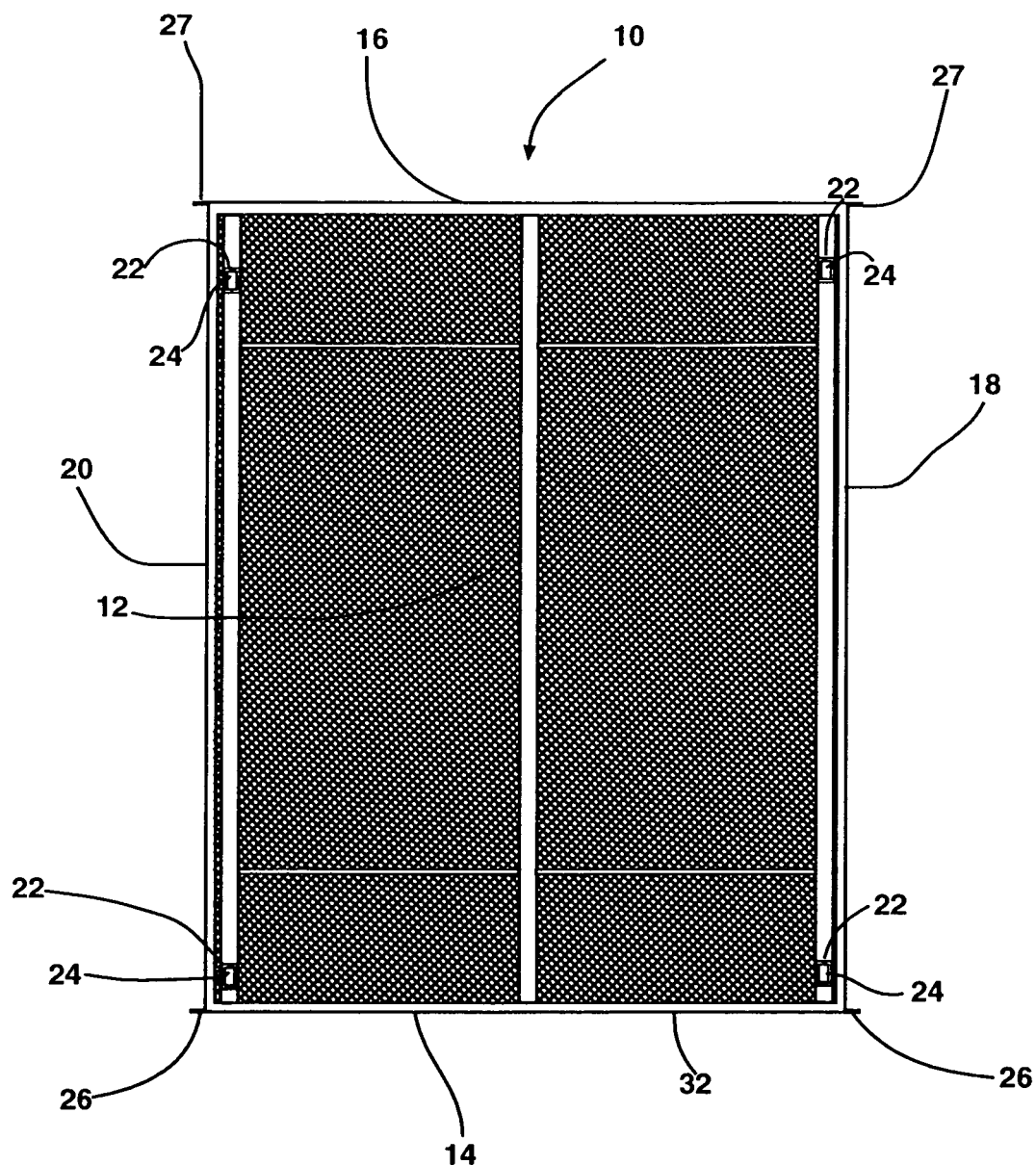
FIG. 4 is a bottom plan view of the preferred embodiment of the invention.

FIGS. 2–4 show the various features of the invention. FIG. 2 shows a perspective view of the storage box 10 of the present invention. The storage cargo box 10 of the present invention has a bottom 12, having a first side 14, a second side 16, a third side 18, and a fourth side 20. The cargo box 10 is configured to have a generally open top portion so as to allow entry of materials into the device from above. This open configuration also provides increased variety in the size of items that can be placed within the storage box 10 of the present invention. In the preferred embodiment, the sides 14, 16, 18, 20 and the bottom 12 of the device are made from a generally square tubular steel frame covered with a steel mesh. In the preferred embodiment, this combination is welded together and powder coated so as to provide maximum protection. While these materials are utilized in the present invention, it is to be distinctly understood that the invention is not limited thereto, but may be variously embodied to include a variety of configurations from a variety of different materials and which are suitable for the applications described in this application.

The bottom 12 of the device of the present invention further comprises at least two chambers 22 that are configured to hold a roller or a wheel 24 therein. The wheels 24 are configured for placement within the chambers 22 and are held in place by at least one axle. These wheels 24 are configured to freely rotate and thus allow the entire storage box 10 to be rolled into and out of the bed of the pickup truck. In the preferred embodiment, the wheels 24 are placed within the tubular steel in such a way so as to allow a portion of each of the wheels 24 to be included within the bottom of the device, and a portion of this wheel 24 to extend below the bottom surface of the bottom 12 of the device itself. The size of the wheels 24 are selected to preferably fit within the tubular steel itself while simultaneously providing sufficient clearance so as to allow the entire box 10 to roll into and out of a desired position within the bed of the pickup truck. In the preferred embodiment of the invention, the wheels 24 are made of a durable polymer material. However, it is to be distinctly understood that the type of material that is used in the wheels is dependent upon the necessity of the user.

In the preferred embodiment, the first side 14 of the box 10 is hingedly connected to the bottom 12 of the box through a hinge 32. This hinge 32 allows the front side 14 to be raised and lowered so as to further facilitate the placement and removal of materials into and out of the box. Depending upon the necessities of the user, a latch 34 may be utilized to hold the first side 14 in a desired upright position. In some embodiments, various reinforcing materials may also be placed in the corners and base of the device 10.

A first tab 26 is connected on or near a portion of the first side 14. This first tab 26 is configured to interact with a portion of the sidewalls of the pickup truck so as to prevent the movement of the cargo box 10 beyond a desired position within the pickup bed. This prevents the cargo box 10 from rolling backward into the pickup and away from the tailgate of the pickup. In the preferred embodiment of the invention, these tabs 26 are configured to be sandwiched between the tailgate and the sidewall of the pickup when the tailgate is positioned in an up position and thus prevent the box 10 from moving toward the front portion of the pickup. A second set of tabs 27 are connected on or near the second side 16 of the cargo box bed and extend beyond the sidewalls of the interior portion of the pickup truck. This configuration prevents the storage box 10 from rolling or being pulled out of the back of the pickup when the tailgate is in a downward position.

In other embodiments of the invention, the second set of tabs 27 are not present but the third side 18 and fourth side 20 of the device are configured so as to interact with a portion of the pickup truck bed, such as the sidewalls or the strikers of the pickup, and thus through this combination prevent the device from being pulled out of the bed of the pickup.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. An easy access cargo box for use in a pickup truck having a pickup truck bed, said cargo box comprising:

a storage box having a bottom, a first side, a second side, a third side, and a fourth side, said bottom defining at least two chambers each of said chambers configured to receive at least one wheel therein, said wheel configured to interact with an underlying surface so as to allow said storage box to be rolled across said underlying surface without the use of any additional hardware being attached to said surface;

a stopping device connected to said storage box, said stopping device configured to prevent said storage box from being pulled past a predetermined location along said underlying surface.

2. The cargo box of claim 1 further comprising a second stopping means, said second stopping means configured to prevent said cargo box from passing beyond a second predetermined location.

3. A cargo box for pickup trucks comprising:

a storage box having a bottom, a first side, a second side, a third side, and a fourth side, said bottom defining at least two chambers, each of said chambers configured to receive at least one wheel therein, said wheel configured to interact with a truck bed surface so as to allow said storage box to be rolled across a bed of a pickup truck without the use of any additional hardware being attached to the bed of said pickup;

a first tab connected to said storage box near said first side, said first tab configured to engage a portion of a pickup truck so as to prevent said storage box from rolling out of said pickup when a tailgate of said pickup truck is opened.

4. The cargo box of claim 3 further comprising a second tab connected to said cargo box near said second side, said second tab configured to interact with a portion of said pickup truck so as to prevent said storage box from rolling away from said tailgate when said tailgate is closed.

5. The cargo box of claim 3 wherein a portion of said third and fourth sides are configured so as to be unable to pass beneath the strikers of a pickup truck bed.

6. The cargo box of claim 1 wherein said bottom is comprised of a frame and a cover.

7. The cargo box of claim 1 wherein said cover is made of a mesh material.

8. The cargo box of claim 1 wherein said first side is hingedly connected to said bottom so as to allow said first side to open.

9. A cargo box for use within a pickup truck comprising:

a storage box having a bottom, said bottom comprised of a bottom frame and a metal mesh cover, a first side, a second side, a third side, and a fourth side, said bottom frame defining at least two chambers, each of said chamber configured to receive at least one wheel therein, said wheel configured to interact with a truck bed surface so as to allow said storage box to be rolled across a bed of a pickup truck without the use of any additional hardware being attached to the bed of said pickup;

a first tab connected to said first side, said first tab configured to engage a portion of a bed of a pickup truck so as to prevent said storage box from rolling out of said pickup when a tailgate of said pickup truck is opened;

a second tab connected to said third side, said second tab configured to interact with a portion of said pickup truck so as to prevent said storage box from rolling away from said tailgate when said tailgate is closed;

wherein a portion of said second and fourth sides are configured so as to be unable to pass beneath the strikers of a pickup truck bed and said first side and said third side are each hingedly connected to said bottom so as to allow said first side and said third side to open, said first side and said third side held in an upright position by a latch.

* * * * *